United States Patent
Goshen et al.

(10) Patent No.: US 7,768,920 B2
(45) Date of Patent: Aug. 3, 2010

(54) MEANS AND METHODS FOR DYNAMICALLY ALLOCATING BANDWIDTH

(75) Inventors: Erez Goshen, Or-Yehuda (IL); Oleg Pogorelik, Lapid (IL)

(73) Assignee: Bandwb Ltd., Kiriat Gat (IL)

(*) Notice: Subject to any disclaimer, the term of this patent is extended or adjusted under 35 U.S.C. 154(b) by 1036 days.

(21) Appl. No.: 11/427,289

(22) Filed: Jun. 28, 2006

(65) Prior Publication Data
US 2007/0002897 A1    Jan. 4, 2007

Related U.S. Application Data

(60) Provisional application No. 60/694,673, filed on Jun. 29, 2005.

(51) Int. Cl.
*H04J 3/16* (2006.01)
(52) U.S. Cl. .......................... 370/235; 370/468; 709/223
(58) Field of Classification Search .................. None
See application file for complete search history.

(56) References Cited

U.S. PATENT DOCUMENTS

| | | | | |
|---|---|---|---|---|
| 4,759,017 A | * | 7/1988 | Allan et al. | 370/438 |
| 5,644,573 A | * | 7/1997 | Bingham et al. | 370/503 |
| 5,878,029 A | * | 3/1999 | Hasegawa et al. | 370/236 |
| 2004/0190488 A1 | * | 9/2004 | Bokish et al. | 370/351 |

* cited by examiner

*Primary Examiner*—Chi H Pham
*Assistant Examiner*—Shick Hom
(74) *Attorney, Agent, or Firm*—Martin Fleit; Paul D. Bianco; Fleit Gibbons Gutman Bongini & Bianco PL

(57) ABSTRACT

The present invention discloses a policy managing device embedded in a network communication, adapted to dynamically regulate bandwidth in the segment between a user and a service provider for temporary providing of content. The invention also discloses a method for managing bandwidth allocation comprising receiving a request from the user or the service provider to increase the bandwidth, deciding whether or not to allow bandwidth increasing, increasing the bandwidth for a predetermined period of time and decreasing the bandwidth to the former bandwidth.

10 Claims, 10 Drawing Sheets

| Session Log Learning | | | | |
|---|---|---|---|---|
| SP-1 | | | | |
| Segment-AC1 | service A | | Service B | |
| | Avr | Var | Avr | Var |
| User-1 | 50 | 6 | 10 | 1 |
| User-2 | 40 | 3 | 2 | 0.5 |
| User-3 | 60 | 2 | 3 | 3 |
| User-4 | 20 | 10 | 15 | 1 |
| User-5 | 30 | 2 | 17 | 2 |
| User-6 | 80 | 5 | 5 | 0.5 |
| User-7 | 100 | 3 | 7 | 1 |
| User-n | | | | |
| Aver User | 54.3 | 5.4 | 8.4 | 1.7 |
| Segment-AC5 | service A | | Service B | |
| | Avr | Var | Avr | Var |
| User-... | | | | |
| | | | | |
| Segment-TR1 | service A | | Service B | |
*Fig 9A*
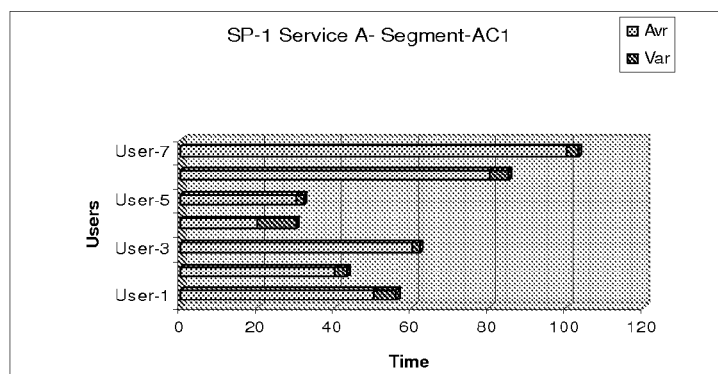
*Fig. 9B*
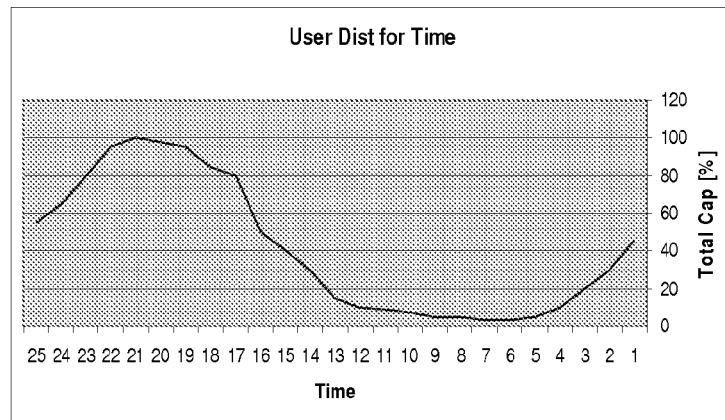
*Fig. 9C*

MEANS AND METHODS FOR DYNAMICALLY ALLOCATING BANDWIDTH

BACKGROUND OF THE INVENTION

1. Field of the Invention

The present invention generally relates to means and method for dynamically allocating bandwidth.

2. Description of the Related Art

The proliferation of broadband Value-Added Services such as video on demand, video conferencing, voice over IP, video phone, gaming, remote backup/restore, remote software updating/purchasing and other services, and their expected growth, pose an attractive business opportunity for service providers. However, service providers are facing real difficulty to capitalize on these services in the residential and small business markets, typically comprised of non-guaranteed (best effort) bandwidth customers that are charged fixed-rate pricing schemes.

Today's system accept decision, based on the current resource allocation map, which does not ensure optimal allocation and as well, does not support such a features as service planning (rescheduling) and resource reservation (scheduled services). In order to provide mentioned features, resource managed must have information about service duration. Service duration could be determined only for services like Video or music on Demand, where duration is specified by the content (movies, length).

Interactive services, like Voice, Conferencing, etc. aren't supply duration information and as the matter of fact can't be handled effectively in the resource allocation. Interactive session termination is determined de facto and not estimated. I.e. System can not approve (reserve, schedule) next session before termination of the currently running.

The lack of handling of network resources combined with the presence of different application requirements creates 'traffic jams', service degradations and failures, as the services compete over shared, limited resources.

A cost-effective policy managing device embedded in a network communication adapted to dynamically regulate bandwidth in the segment between a user and a service provider for temporary providing of content is a long felt need.

It is a first object of the present invention to disclose a policy managing device embedded in a network communication, adapted to dynamically regulate bandwidth in the segment between a user and a service provider for temporary providing of content, comprising a policy server (PS), adapted to provide management for users, service providers and network policies; resources admission controller (RAC), adapted to provide NMS/OSS integrated network monitor, predictive admission controller; flow controller (FC), adapted to implement various operational flows, aimed to provide support for different management models, network topologies and environments; report generator, adapted to provide reports helping network planning and revenue planning and analysis such as reports per subscriber, service and network, e.g. quota utilization, network loading, percentage of denies, subscribers activities, etc; management and control module, adapted to provide administrator portals enabling operators to run BwPRM, ASP integration kit and element manager functionalities.

It is another object of the present invention wherein adapted to manage users and ASPs policies regarding QoS on demand access, manage network topology, manage run-time allocation and/or release of the network resources due to service requirements, learning and analyzing user and network consumption, monitoring network utilization and reporting users on the current situation and predicting future scenarios.

It is another object of the present invention wherein said policy server considers network parameters selected from bit-rate, delay, jitter and by concurrent streams and bandwidth.

It is another object of the present invention wherein adapted to decide whether to allocate bandwidth to the end-user immediately, deny said allocation, allocate in a delayed time, or allocate less bandwidth than requested by the user.

It is another object of the present invention wherein further comprising a learning & prediction engine adapted to collect information about user activities selected from session duration, service type, peak time and network behavior selected from availability and resource utilization and providing loading forecasts, resource reservation, and interactive QoS degradation.

It is another object of the present invention wherein further comprising at least one pluggable adapter for communication with network enforcement elements.

It is another object of the present invention wherein adapted to increase bandwidth allocation for one or more users in a SOHO network, or any group of users belong having a general bandwidth allocation.

It is another object of the present invention wherein adapted to ensure virtually private service space for end-users under one authority.

It is another object of the present invention wherein adapted to consider transport aggregation on at least one segment so as to detect bottlenecks restrictions before arriving at a conclusion about resource end-to-end availability.

It is also in the core of the present invention to disclose a method for managing bandwidth allocation, comprising receiving a request from the user or the service provider to increase said bandwidth, deciding whether or not to allow bandwidth increasing, increasing said bandwidth for a predetermined period of time and decreasing said bandwidth to the former bandwidth.

It is another object of the present invention wherein further comprising at least a portion of the following steps, selected from checking users policy, checking network resources availability, reserving quota on the delivery elements, creating decision, commanding traffic enforcers & moving session state, generating accounting information record.

It is another object of the present invention wherein said decision is selected from a group consists of denying the request, allocating the bandwidth, rescheduling the allocation of said bandwidth and allocating a portion of the requested bandwidth.

It is another object of the present invention wherein further comprising the steps of calculating the time of which the end-user waits before bandwidth allocating, the maximal bandwidth possibly allocated to one or more users.

It is another object of the present invention wherein further comprising the step of rescheduling bandwidth allocation in case said bandwidth can not be provided immediately.

It is another object of the present invention wherein further comprising the step of analyzing network scenarios and former bandwidth allocations and predicting network behavior and thus allocating bandwidth efficiently.

It is another object of the present invention wherein further comprising the step of predicting resources availability based on network behavior and user profiles.

It is another object of the present invention wherein further comprising the step of ensuring virtually private service space for end-users under one authority.

It is another object of the present invention wherein further comprising the step of considering transport aggregation on at least one segment so as to detect bottlenecks restrictions before arriving at a conclusion about resource end-to-end availability.

SUMMARY OF THE INVENTION

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

The present invention presents effective means to decide if a specific service could be successfully delivered to a specific requesting user. The mechanism of the present invention uses network congestion and/or managed pipes, so called pre configured managed network segments, status, user behavior statistics and prediction gathered over time and usage profile entered by the network operator, service requirement and real time user subjective value for the operator. The means defined hereinafter is adapted to return denial of service, approval or recommended time slot, e.g., reschedule.

In case when service is approved, delivery is guaranteed during the service duration. By supporting SOHO Hierarchies structure, the system defined in the patent enables recognition and control at internal users resolution/level for SOHO sub users.

The present invention also discloses new matter relates to predictive resource allocation based on service and user behavior analysis. The invention further pertains to effective near real time decision making, based on unique network segmentation model and to SOHO sub users' identification.

BRIEF DESCRIPTION OF THE SEVERAL VIEWS OF THE DRAWINGS

In order to understand the invention and to see how it may be implemented in practice, and by way of non-limiting example only, with reference to the accompanying drawing, in which FIG. 1 schematically presents the difference between best effort and static guaranteed policies and best effort, static guaranteed and dynamic guaranteed connection;

FIG. 6, illustrating an access network segmentation map example.

FIGS. 9A-9C schematically presents example for user learned information per user, per service, per segment. To be used for smart resource allocation decision making; and, FIG. 10 schematically presents SOHO sub hierarchy user.

DETAILED DESCRIPTION OF INVENTION

Figure 1:
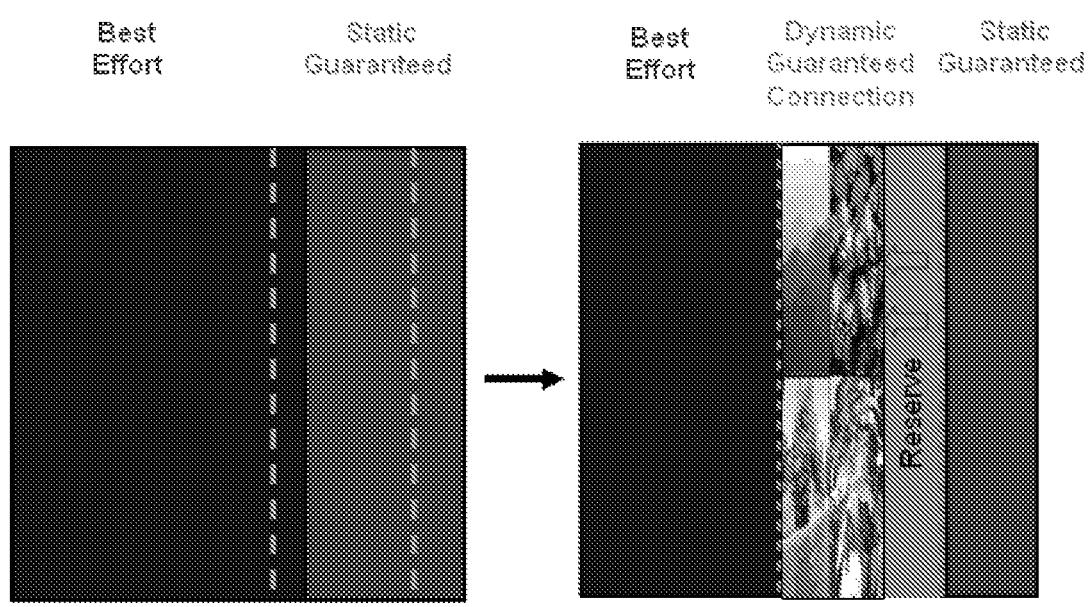

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide policy managing device embedded in a network communication adapted to dynamically regulate bandwidth in the segments between a user and a service provider (so called path) for temporary providing of content.

The term 'Subscriber' refers in the present invention to any residential subscriber, working within Microsoft environment, SOHO, business & SetTop, can activate and deactivate services, can ask for more bandwidth and can change SLA (self provisioning).

The term 'ASP' refers in the present invention to Application Service Providers (e.g., VoD, GoD). The ASP manages services and contents, handle service requests and associated activities (reschedule, degrade QoS). ASPs requires services & content usage reports.

The term 'ISP' refers in the present invention to internet service providers that manage subscribers, handle changes in subscribers' profile (SLA change), maintains subscribers' database and associated portals. ISP also creates packages and performs group operations with users, discounts, sales, etc.

The term 'NSP' refers in the present invention to network service provider that manages regional and transport network, configure resource allocation quota, provides information about network topology and resources mapping, optionally reconfigure network, changes network status and resource quota in run time, requires report about network resources utilization and more.

The term 'plurality' applies hereinafter to any integer greater than or equal to one.

The term 'segment' refers hereinafter to a managed restricted network resource. Segments restrictions could be physical (actually restricted resources) and administrative (resources that are restricted by administrator, e.g., due to SLA). It is assumed that each subscriber and service is attached to the appropriate segment. Segment hierarchy is supported, i.e. segment could be aggregated in other segment, which means that several bottlenecks (restrictions) to be checked before coming to conclusion about resource end-to-end availability.

The term 'static guaranteed' refers hereinafter to a policy guarantees a static bandwidth to each virtual channel. A minimum bit rate value must be specified so that the actual bit rate is guaranteed up to this boundary value. The unused bandwidth (minimum bit rate, instant bit rate) is reserved and cannot be allocated to other virtual channels.

The term 'SOHO' refers hereinafter to a Small office/home office local area network. SOHO networks generally are confined to a single room. Such networks generally use a router, small Ethernet switch, or hub and cat 5 cabling, or a Wi-Fi wireless network.

Generally SOHO networks are used to share files, Internet access, and other information. A SOHO network may also have a server which needs to be accessed. A wireless network may be enough to satisfy these requirements but a wired network may be both more efficient and more secure.

The term 'dynamic guaranteed' refers hereinafter to a policy guarantees a dynamic bandwidth to each virtual channel. A minimum bit rate value must be specified so that the actual bit rate is guaranteed up to this boundary value. Contrary to the static guaranteed policy, the unused bandwidth (minimum bit rate-instant bit rate) is not lost, but can be allocated to other virtual channels.

The term 'best effort' refers hereinafter to a bit rate allocated to this virtual channel(s) depends on the available bandwidth. This type of virtual channel has no priority regarding the guarantee of the bit rate.

The present invention provides smart End-to-End access management, guaranteed performance, reliability, scalability, and interoperability across all services and across different networks. It optimizes broadband network utilization by dynamically allocating resources to privilege paying subscribers. The platform optimizes resources across the network, enabling efficient delivery of a variety of services. The device enables the opening of new business models for service providers consisting of flexible and adjustable usage rates per actual consumed services and support accounting of actual resource consumption and quota management.

The device is connected to end-users and service providers in order to store the locations and bandwidth consumption, so as to efficiently allocate bandwidth. The device is also connected to bandwidth (BW) allocating device, such as traffic shaper, BRAS, CMTS, Base Station GGSN and SGSN, requesting from the device to change resource allocation e.g., increase the BW in a predetermined amount of Kbps for a predetermined period of time e.g., for specific end user for specific service to this user, depends on the network resources. The device reservation capabilities enable the operator to utilize pre-reserved recourses for advertised events such as music and sports shows.

The operator can allocate a guaranteed pipe (number of connections/total bandwidth) for a specific event (or sell license to ASP (retail)). The ASP/Operator will advertise the event on his site and enables users to register for the event.

The device receives the end users reservation/registration requests and will reserve bandwidth for those users over the guaranteed pipe. The actual allocation enforcement commands to the network resource controller's (NRCs such as BRAS or traffic shapers) will be sent at the right time by the system to the relevant devices.

The system allows real time changes or updates for the overall quota of the guaranteed pipe. Usually, the bandwidth is defined by the best effort and static guaranteed policies. The present invention defines the bandwidth by best effort, static guaranteed policy and dynamic guarantee. This enables the system to allocate extra bandwidth for predetermined period of times. Extra bandwidth is required mainly for video on demand, web-based games and other applications. End-users and service providers can ask for extra bandwidth from the system. They can choose the extra bandwidth they need, and pay accordingly. In case the user requests for extra bandwidth, the system checks whether it is possible and decides. The decision can be denying the request, increasing the bandwidth immediately, reschedule the time for increasing the bandwidth, or increasing the bandwidth with less Kbps than requested.

The network locations of the end-user and system providers are stored in the system, so as to learn users, service and network behavior and predict amount and times of requests for bandwidth allocation. This can enable the system to pre-calculate the allocations, and decide whether to allocate bandwidth respectively (so called,—strict prediction). In order to be able to predict resource utilization, the system must know session duration. For the services such as Video on Demand the duration could be understood from content settings.

Services like VoIP, video conferences are calculated in order to create statistics creation. I.e. every user has associated DB record, where statistics are stored such as average and variance of session duration for different Services. These statistics are updated every time the system handles request of the appropriate user. In another embodiment of the present invention, user's daily quota consumption statistics are handled by the separate Sub-system and stored in the separate DB. This statistics are updated periodically and are based on the Session Log. These statistics are used in decision engine in order to reserve quota for high priority and "heavy" users.

Another object of the present invention is to monitor network utilization. The system manages the allocation and traces present and future allocation. The system is also aware of the segment in which the extra BW is provided, and the time the allocation ends. The system provides end-users and service providers with online messages in case the BW increase is impossible, due to the network monitoring. This way, in case the system monitors full capacity on one or more segments, a user can not be provided with extra BW if the content will have to be transmitted through the same segment.

Another object of the present invention discloses a method for managing bandwidth allocation. The method comprising receiving a real time request/s from the user/s or the service providers/services to increase resource, said bandwidth, deciding whether or not to allow bandwidth increasing, increasing said bandwidth for a predetermined period of time and decreasing said bandwidth to the former bandwidth. In case the end-user sends the request, the system checks user's policy. In other words, the system checks whether the user can be provided with more bandwidth for a period of time according to the user package. For example, the user wishes to be provided with extra 4 mega bytes per second down stream for 100 minutes. The system checks the user's record to see that the user already paid for at least 100 minutes and checks whether the user paid for this service type. If not, a message is shown to the user. In some embodiments, the system checks whether the user is only approved for a monthly limited period of time for bandwidth allocation, so the system checks that as well. If the user policy is sufficient, the system checks if the user monthly quota is not exceeded and if the SP monthly quota is not exceeded.

After checking user policy and network policies, the system checks network resources availability. In other words, the system checks if the segment/delivery element is active, if the quota is available within session duration, especially in terms of bit-rate, delay, jitter for upstream and downstream.

Then, the system reserves quota on the delivery elements. The system checks services reschedule range if exceeded and calculates the delay for the service, in case the network recourses obey the extra bandwidth allocation. In some cases the system checks BE network trend forecast.

Reference is made now to FIG. 1, schematically presents the difference between best effort and static guaranteed policies and best effort, static guaranteed and dynamic guaranteed connection. Prior art technologies did not use only static guaranteed policy and were unable to provide end-users with temporary increase of bandwidth. Using some of the static guaranteed bandwidth, called dynamic guaranteed connection, enables the device to increase the bandwidth and improve Quality of service and grade of service.

Figure 2:
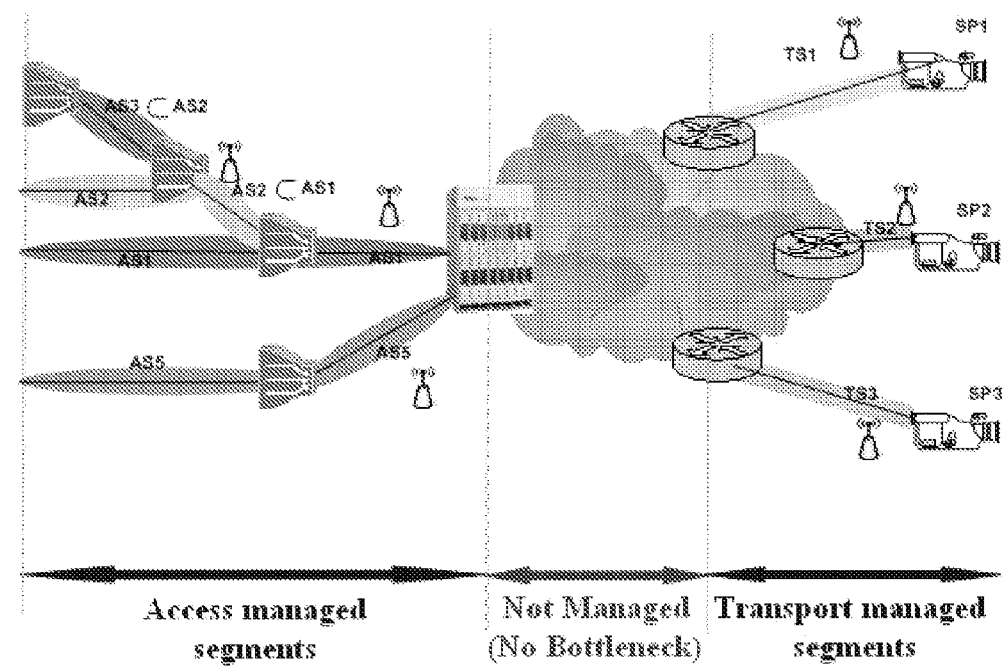
FIG. 2 schematically presents the segments connecting end-users, service providers, the bandwidth allocation device and the policy managing device and bottlenecks thereof.

Reference is made now to FIG. 2 schematically presents the segments connecting end-users, service providers, the bandwidth allocation device and the policy managing device and bottlenecks thereof. The three service providers, SP1, SP2 and SP3, are connected to the policy managing device by three segments, TS1, TS2 AND TS3, respectively. On the other hand, 4 end-users, AS1, AS2, AS3 and AS5, are connected by only two main segments, AS1 and AS5. Bandwidth allocation for users AS1, AS2, AS3 is affected by present bandwidth of each of them. For example, if AS1, AS2 and AS3 are provided with 250 Kbps and the segment capacity is 1200 Kbps and AS1 requests for extra 500 Kbps, the device decision will be either denying the request or providing only 450 Kbps. All the traffic on the segments, traffic from service providers and traffic to end-users is logged in the system, so as to facilitate calculations regarding network consumption and decreasing the processing time. For example, if AS1 and AS2 are registered under the same bandwidth, the device can allocate some of AS1's bandwidth to AS2 without AS1 permission, so as to automatically improve AS2's Qos.

Figure 3:
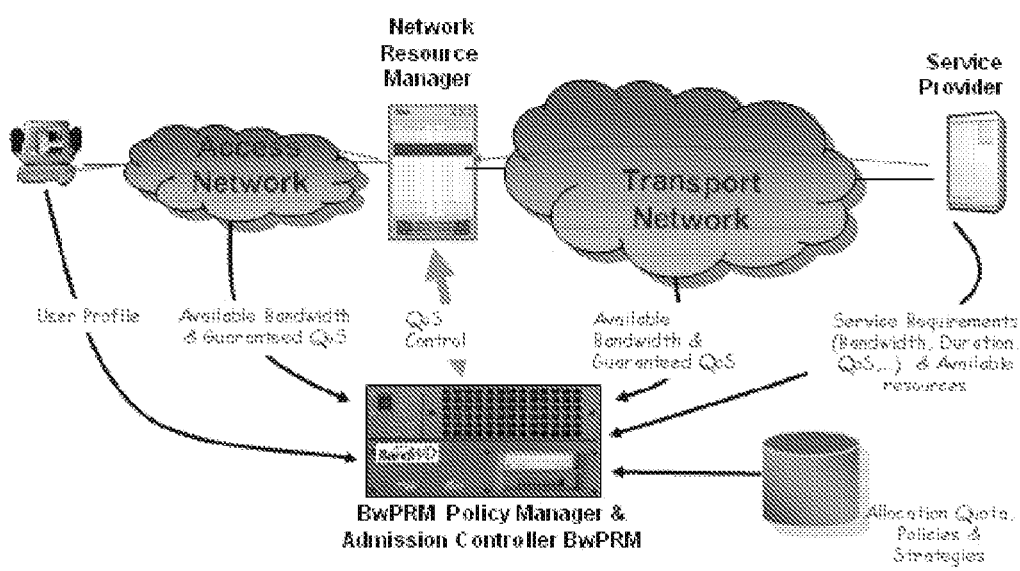
FIG. 3 schematically presents interconnections among service provider, network resource manager, and end-users with the policy managing device.

Reference is made now to FIG. 3 schematically presents interconnections among service provider, network resource manager, and end-users with the policy managing device. The policy managing device is connected to a database storing the allocation quota, policies and strategies, to the end-user and service provider, which requests for extra bandwidth in specific time, for a certain period of time, in at least one segment on the network. The device also monitors the network in terms of locations and capacities, receives data and decides whether or not to allocate extra bandwidth. In case the policy managing device decides to allocate extra bandwidth, it provides the network resource manager with suitable details.

Figure 4A:
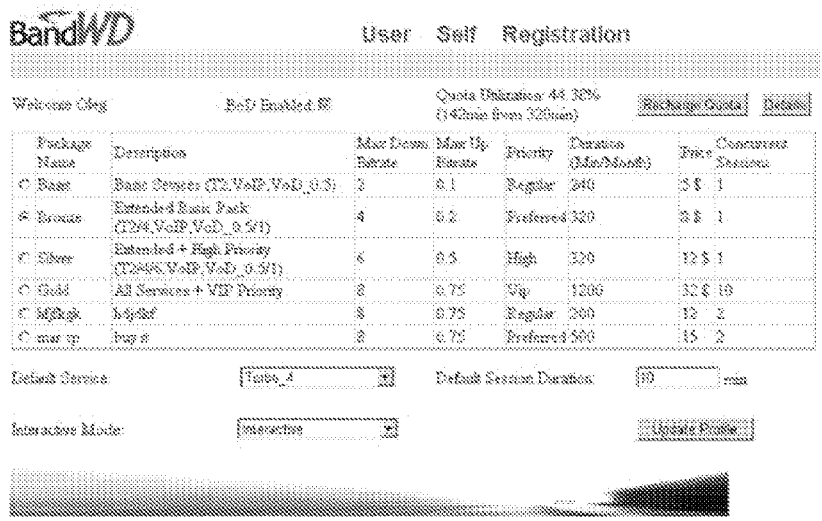
FIGS. 4A and 4B schematically present one of the user self registration displayed to the end users, showing package selecting and updating, one of the tables displayed to the system administrator, showing the session management portal.

Reference is made now to FIG. 4A which schematically presents the one of the user self registration displayed to the end users, showing package selecting and updating. Each of the users is registered to specific packages in the system's database, classified by its priority, possible communication protocols, location, path, maximal upload and download bitrates, duration, payment agreements or any of the like. Further, all requests regarding extra bandwidth is also logged in the system, mainly divided to former allocations are requests that are provided or will be provided. The system calculates and displays the delay time, if any, and extra bandwidth available for any request.

Figure 4B:
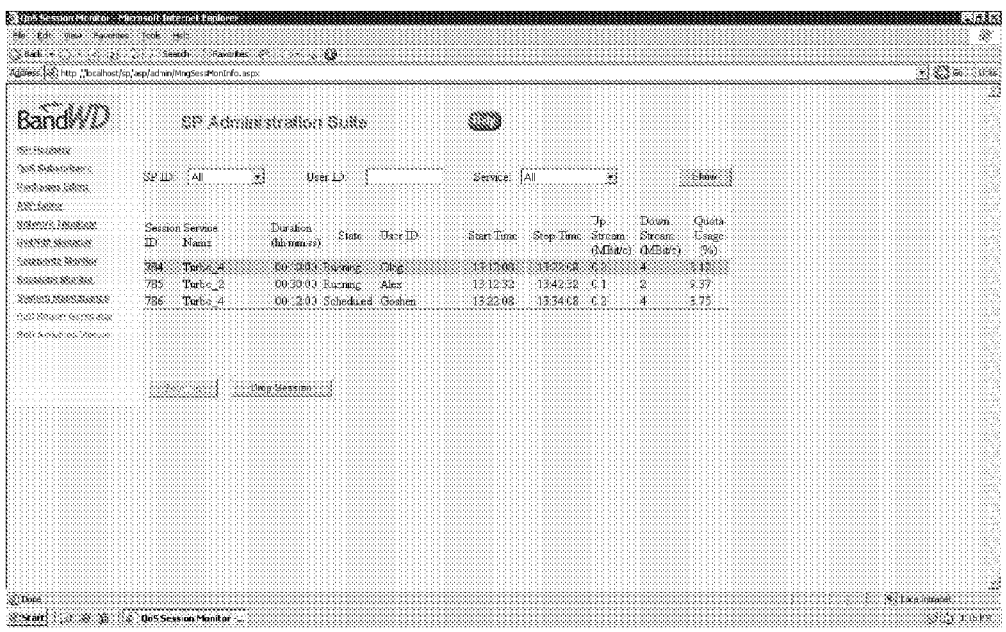

FIG. 4B schematically presents the one of the tables displayed to the system administrator, showing the session management portal viewing current active sessions per service provider resolution.

Virtual Resource Segmentation

Figure 5A:
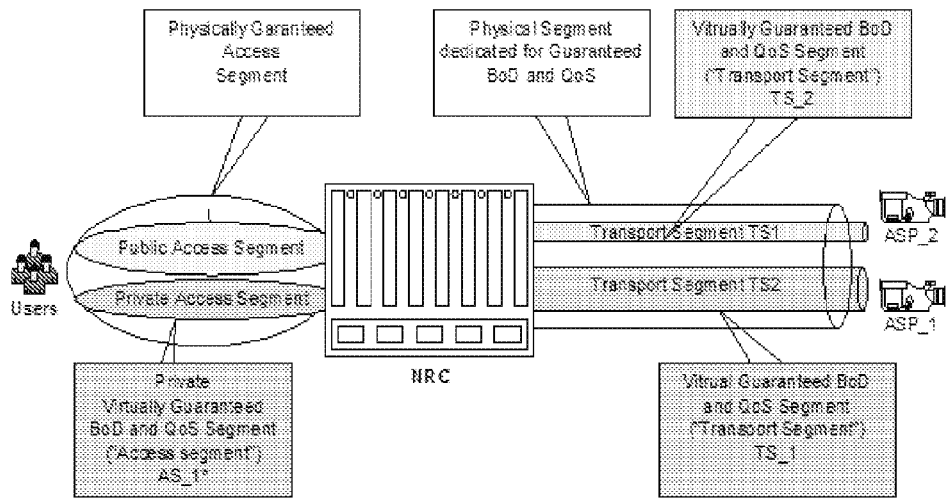
FIG. 5A-5B schematically present general segmentation concept.
Figure 5B:
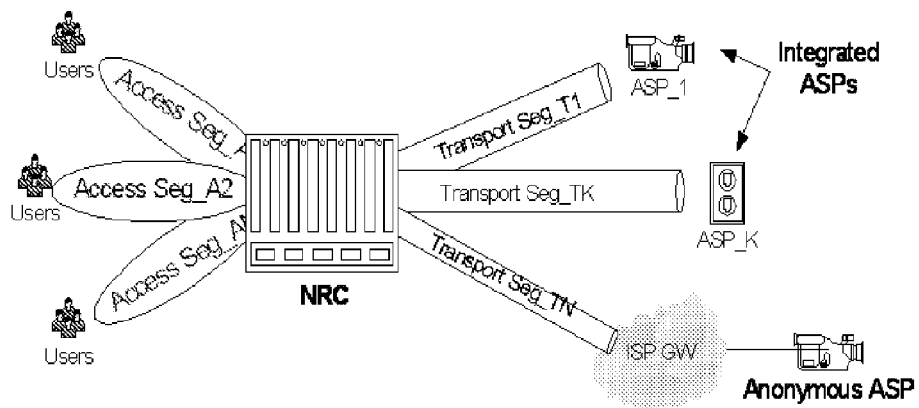
Figure 5B:
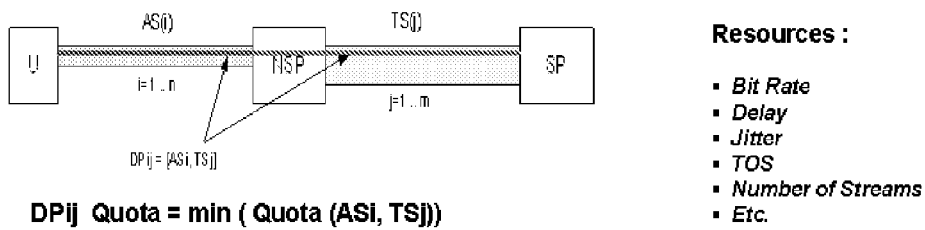

It is in the purpose of one embodiment of present invention to disclose mechanism adapted for resource allocation. The mechanism is based on virtual resource segments, which significantly reduces system complexity and enables near real time response time. Each service is delivered via optional access and/or transport segments. Each segment may comprise of internal segments (composite). Reference is made now to FIG. 5A-5B, wherein resource allocation is preferably yet not exclusively done on the virtual segments, managed by this mechanism.

According to yet another embodiment of the present invention, segments as defined in any of the above are managed, restricted, network resources in a manner selected from the following: (i) Segments restrictions are physical (actually restricted resources) and administrative (resources that are restricted by administrator, e.g. due to SLA); (ii) It is assumed that each Subscriber and Service is attached to the appropriate segment at specific time; (iii) Segment hierarchy is supported, i.e., a segment could be aggregated in other segment, which means that several bottlenecks (restrictions) must be checked before arriving at a conclusion about resource end-to-end availability.

Each segment is preferably yet not exclusively described by the set of available resources and constraints to be checked. Resources quotas are calculated, accumulated, etc., constraints are matched or not.

Admission procedure checks resources availability and constraints matching between services requirements and network capabilities along service delivery path. Service delivery may include several segments.

If all the segments match service requirements regarding (i) resources, e.g., bandwidth, concurrent streams; (ii) constraints, e.g., delay, jitter, packet loss etc. Then, network resources controllers (enforcers) will be directed to allocate necessary resources. When a segment is administrative, it is not associated with any NRC and resource allocation is performed virtually, i.e. accounted by BwPRM. BwPRM support multiple concurrent ASPs, ISPs and Services, while ensuring isolated business spaces for every one of the actors.

Figure 6:
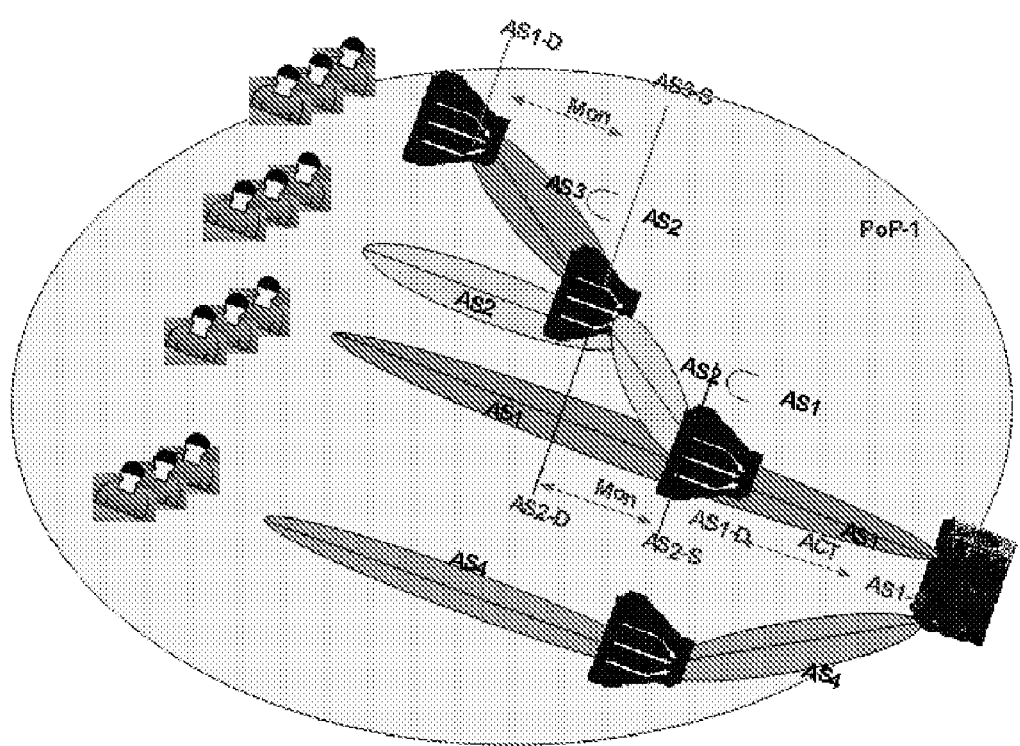
FIG. 6 schematically presents segment hierarchy; segments control monitor only and active control through NRC device.

Reference is now made to FIG. 6, illustrating a access network segmentation map example.

Predictive Resource Reservation & Scheduling

Figure 7A:
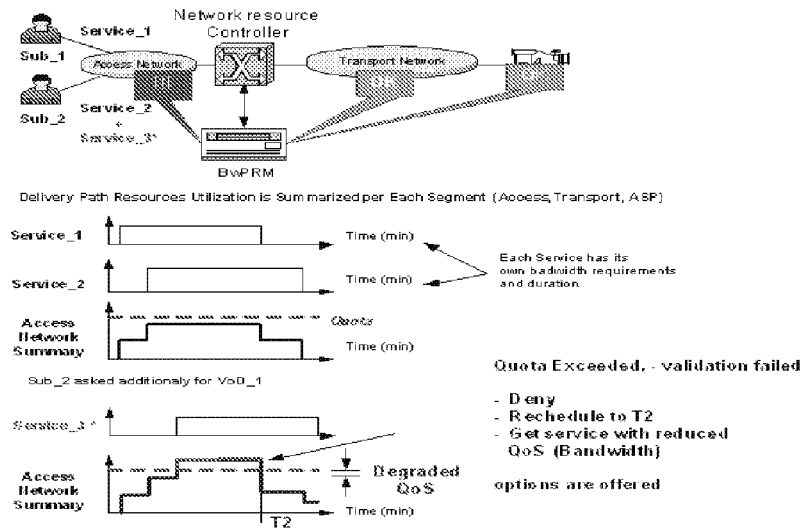
FIG. 7A-7B Example of the quota utilization change over the time and scheduling concept.
Figure 7B:
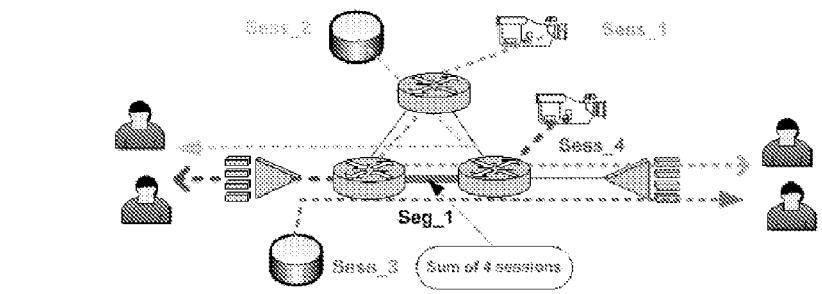
Figure 7B:
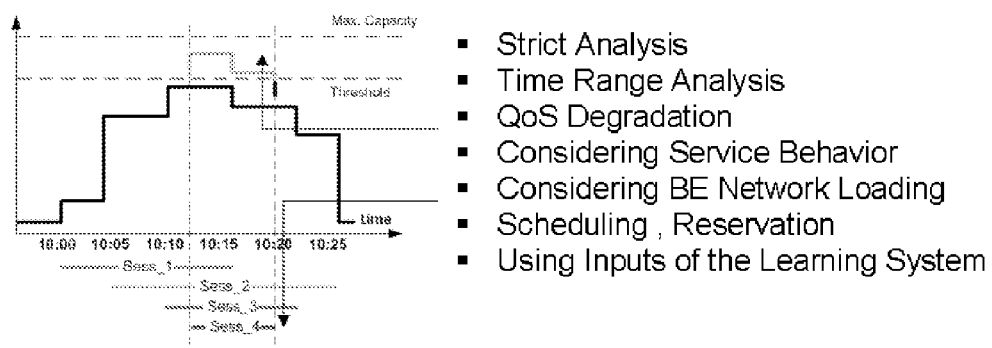

Reference is now made to FIG. 7A-7B, schematically displaying a mechanism according to yet another embodiment of the present invention, wherein engine includes resource prediction mechanism and supports session reschedule capability. This embodiment provides alternative for service where regular systems are giving up.

It is acknowledged in this respect that the present invention support and enables various prediction levels, as those listed in anon-limiting manner below:

Level 1 provides no prediction, e.g., immediate session approves or rejects decisions. Session is approved if current resource utilization allows additional activation of the additional session. If not, session will be rejected.

Level 2 provides strict prediction, e.g., as Level 1 only with rescheduling of the bandwidth allocation. In order to be able to predict resource utilization, PRM must know Session Duration. For the services such as VoD the duration could be understood from content settings. Services like VoIP, video conferences are participating in statistics creation, i.e. Every User have associated DB record, where stored usage statistics such as average and variance of session duration for different Services. These statistics are updated every time PRM handles request of the appropriate user.

Level 3 predict users' activities. User's daily quota consumption statistics are handled by the separate sub-system (learning system) and stored in the separate DB. This statistics are updated periodically and are based on the session log. These statistics are used in decision engine in order to reserve quota e.g. for high priority and "fat" users.

Level 4 provides service behavior refinements. Session quota utilization could be fine tuned for different service types. Service consumption shape is created offline. It is acknowledged in this respect that in an non-limiting manner Level 3 and 4 quotes are optional and could be supplied and are activated upon demand. All the learning is performed only for the users, registered in PRM (not all ISP subscribers). Statistics are created only for Guaranteed Services. Statistics L-2 are updated on every session. L3 Statistics are updated once per time period. L4 Statistics are created off-line by using appropriate utilities. Operator may activate PRM in LEARNING mode, where L2-4 prediction mechanisms are disabled, but statistics are handled. After Learning, Operator may activate PRM in TRANSPARENT mode, where L2-4 prediction mechanisms are still disabled, but system accumulated. Deviation between actual and predicted session behaviors. Operator may move Prediction to the ACTIVE mode after coming to conclusion that prediction is close to the reality.

The present invention also discloses a novel decision engine, adapted to enable unique functionalities such as predict resources availability wherein the mechanism knows session termination time. The invention also facilitates Session Scheduling, e.g., wherein shift service start to the first available time. Moreover, offer service degradation is possibly provided instead of outright rejection Learning of the Service Duration For services which do not provide exact duration, the policy managing device according to another embodiment of the present invention is applicable by its learning system capabilities. The device of the present invention implements predetermined algorithm for calculation of the expected (predicted) service duration per Subscriber [x], service type [y], time of the day[z] which enables effective resource allocation and planning in the networks.

Figure 8:
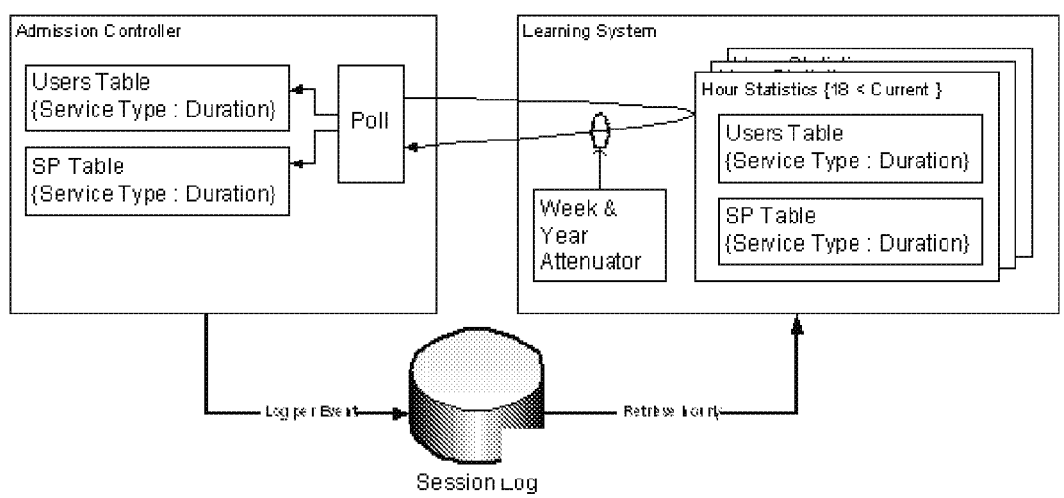
FIG. 8 schematically presents decision making while utilizing Service and User Behavior Analysis based on learned information.

Reference is now made to FIG. 8, schematically describing an implement smart decision based on algorithms which makes use of the retrieved and calculated information of the learning system. Segments resource availability prediction uses an estimated/predicted service duration algorithm could consider information such as user behavior, service nature and network behavior. Possibly, the aforesaid learning system is a standalone log based system.

Reference is now made to FIGS. 9A-9C, schematically describing learning system information according to one embodiment of the present invention.

Ensuring Virtually Private Space for SOHO Users Hierarchy

Figure 10:
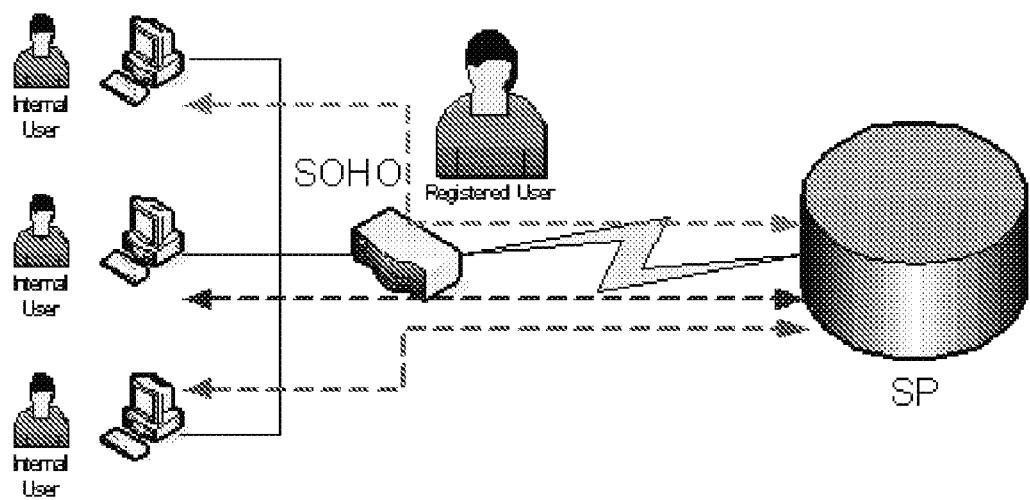

As schematically presented in FIG. 10, the present invention also supports SOHO Hierarchies, wherein SOHO usually presents several users under one authority. Each SOHO is registered as single user for billing and accounting purposes. However, each internal user, e.g., sub user is ensured with virtually private service space. Accordingly, internal user, e.g., sub user may control only his/her sessions. The solution is thus possibly based on smart IDs allocation for users and internal users and sessions.

The invention claimed is:

1. A method for managing bandwidth allocation in a network, comprising the steps of
   a. providing a policy managing device embedded in a network communication, adapted to dynamically regulate bandwidth in the segment between a user and a service provider for temporary providing of content, said device comprising:
      i. a policy server (PS), adapted to provide management for users, service providers and network policies;
      ii. resources admission controller (RAC), adapted to provide integrated network monitor of a network management system (NMS) and/or an operation support system (OSS), said controller being predictive an admission of resources;
      iii. flow controller (FC), adapted to implement various operational flows, aimed to provide support for different management models, network topologies and environments;
      iv. report generator, adapted to provide reports helping network planning and revenue planning and analysis including reports per subscriber, service and network, further including quota utilization, network loading, percentage of denies, subscribers activities, etc; and,
      v. management and control module, adapted to provide administrator portals enabling operators to run a proactive resource manager (PRM), application service provider (ASP) integration kit and element manager functionalities;
   b. receiving by said device a request from the user or the service provider to increase said bandwidth;
   c. deciding by said device whether or not to allow bandwidth increase;
   d. increasing by said device said bandwidth for a predetermined period of time; and
   e. decreasing by said device said bandwidth to the former bandwidth,
   wherein said method further comprises the step of rescheduling bandwidth allocation in case said bandwidth cannot be provided immediately.

2. The method according to claim 1, further comprising at least a portion of the following steps, selected from checking users policy, checking network resources availability, reserving quota on the delivery elements, creating decision, commanding traffic enforcers and moving session state, generating accounting information record.

3. The method according to claim 1, wherein said decision is selected from a group consists of denying the request, allocating the bandwidth, rescheduling the allocation of said bandwidth and allocating a portion of the requested bandwidth.

4. The method according to claim 1, further comprising the steps of calculating the time of which the end-user waits before bandwidth allocating, the maximal bandwidth possibly allocated to one or more users.

5. The method according to claim 1, further comprising the step of analyzing network scenarios and former bandwidth allocations and predicting network behavior and thus allocating bandwidth efficiently.

6. The method according to claim 1, further comprising the step of predicting resources availability based on network behavior and user profiles.

7. The method according to claim 1, further comprising the step of ensuring virtually private service space for end-users under one authority.

8. The method according to claim 1, further comprising the step of considering transport aggregation on at least one segment so as to detect bottlenecks restrictions before arriving at a conclusion about resource end-to-end availability.

9. A method for managing bandwidth allocation in a network, comprising the steps of
   a. providing a policy managing device embedded in a network communication, adapted to dynamically regulate bandwidth in the segment between a user and a service provider for temporary providing of content, said device comprising:
      i. a policy server (PS), adapted to provide management for users, service providers and network policies;
      ii. resources admission controller (RAC), adapted to provide integrated network monitor of a network management system (NMS) and/or an operation support system (OSS), said controller being predictive an admission of resources;
      iii. flow controller (FC), adapted to implement various operational flows, aimed to provide support for different management models, network topologies and environments;
      iv. report generator, adapted to provide reports helping network planning and revenue planning and analysis including reports per subscriber, service and network, further including quota utilization, network loading, percentage of denies, subscribers activities, etc; and, v. management and control module, adapted to provide administrator portals enabling operators to run a proactive resource manager (PRM), application service provider (ASP) integration kit and element manager functionalities;

b. receiving by said device a request from the user or the service provider to increase said bandwidth;

c. deciding by said device whether or not to allow bandwidth increase;

d. increasing by said device said bandwidth for a predetermined period of time and e. decreasing by said device said bandwidth to the former bandwidth;

wherein said method further comprises the step of hierarchic segmenting said network communication.

10. A method for managing bandwidth allocation in a network, comprising the steps of a. providing a policy managing device embedded in a network communication, adapted to dynamically regulate bandwidth in the segment between a user and a service provider for temporary providing of content, said device comprising:

i. a policy server (PS), adapted to provide management for users, service providers and network policies;

ii. resources admission controller (RAC), adapted to provide integrated network monitor of a network management system (NMS) and/or an operation support system (OSS), said controller being predictive an admission of resources;

iii. flow controller (FC), adapted to implement various operational flows, aimed to provide support for different management models, network topologies and environments;

iv. report generator, adapted to provide reports helping network planning and revenue planning and analysis including reports per subscriber, service and network, further including quota utilization, network loading, percentage of denies, subscribers activities, etc; and, v. management and control module, adapted to provide administrator portals enabling operators to run a proactive resource manager (PRM), application service provider (ASP) integration kit and element manager functionalities;

b. receiving by said device a request from the user or the service provider to increase said bandwidth;

c. deciding by said device whether or not to allow bandwidth increase;

d. increasing by said device said bandwidth for a predetermined period of time and e. decreasing by said device said bandwidth to the former bandwidth;

wherein said method further comprises step of recommending to said user a more appropriate time slot.

* * * * *